United States Patent
Wu (10) Patent No.: US 8,209,404 B2
(45) Date of Patent: *Jun. 26, 2012

(54) METHOD, DEVICE AND SYSTEM FOR CONFIGURING DEVICE PARAMETERS IN DIGITAL SUBSCRIBER LINE ACCESS NETWORK

(75) Inventor: Huangwei Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/177,095

(22) Filed: Jul. 6, 2011

(65) Prior Publication Data

US 2011/0264774 A1 Oct. 27, 2011

Related U.S. Application Data (63) Continuation of application No. 12/245,864, filed on Oct. 6, 2008, now Pat. No. 7,991,861, which is a continuation of application No. PCT/CN2007/001089, filed on Apr. 4, 2007.

(30) Foreign Application Priority Data

Apr. 7, 2006 (CN) .......................... 2006 1 0060259
Jul. 17, 2006 (CN) .......................... 2006 1 0061718

(51) Int. Cl.
*G06F 15/173* (2006.01)
(52) U.S. Cl. ........................................ 709/221; 220/223
(58) Field of Classification Search ........... 709/220–223
See application file for complete search history.

(56) References Cited

U.S. PATENT DOCUMENTS

| | | | |
|---|---|---|---|
| 6,304,905 B1 | 10/2001 | Clark | |
| 6,360,260 B1* | 3/2002 | Compliment et al. | 709/224 |
| 6,944,631 B2* | 9/2005 | Peter | 1/1 |
| 7,124,343 B2 | 10/2006 | Moulsley et al. | |
| 7,187,656 B2 | 3/2007 | Lazarus et al. | |
| 2004/0009767 A1* | 1/2004 | Lee et al. | 455/422.1 |
| 2004/0034862 A1* | 2/2004 | Kadota | 719/321 |
| 2005/0050062 A1 | 3/2005 | Hanes et al. | |
| 2006/0026267 A1* | 2/2006 | Godin et al. | 709/220 |
| 2006/0041660 A1* | 2/2006 | Bishop et al. | 709/224 |

(Continued)

FOREIGN PATENT DOCUMENTS

CN 1586048 A 2/2005

(Continued)

OTHER PUBLICATIONS

1st Information Disclosure Statement in corresponding U.S. Appl. No. 12/245,864 (Oct. 6, 2008).

(Continued)

*Primary Examiner* — Abdullahi Salad (74) *Attorney, Agent, or Firm* — Leydig, Voit & Mayer, Ltd.

(57) ABSTRACT

A method for configuring device parameters in a Digital Subscriber Line access network is disclosed. According to the method, a managing device sends a parameter modifying command to a managed device; the managed device makes a response to the parameter modifying command and modifies parameters; the managed device obtains an applying opportunity of unapplied parameters; the managed device applies the unapplied parameters according to the applying opportunity. A Digital Subscriber Line access system and a network device are also disclosed.

4 Claims, 5 Drawing Sheets

U.S. PATENT DOCUMENTS

2006/0140612 A1* 6/2006 Yata .............................. 396/124
2006/0230130 A1* 10/2006 Cho et al. ...................... 709/223

FOREIGN PATENT DOCUMENTS

| CN | 1635760 A | 7/2005 |
|---|---|---|
| CN | 1650606 A | 8/2005 |
| CN | 101110696 B | 8/2010 |
| EP | 1351424 A2 | 10/2003 |
| WO | WO 2005/104557 A1 | 11/2005 |

OTHER PUBLICATIONS

2nd Information Disclosure Statement in corresponding U.S. Appl. No. 12/245,864 (Apr. 15, 2009).

3rd Information Disclosure Statement in corresponding U.S. Appl. No. 12/245,864 (Jan. 3, 2011).

1st Office Action in corresponding U.S. Appl. No. 12/245,864 (Dec. 13, 2010).

1st Office Action in corresponding Chinese Application No. 200610060259.0 (Mar. 12, 2010).

Written Opinion of the International Searching Authority in corresponding PCT Application No. PCT/CN2007001089 (Jul. 19, 2007).

Bernstein et al., DSL Forum TR-069—CPE WAN Management Protocol, DSL Home-Technical Working Group, May 2004, Broadband Forum, Fremont, California.

* cited by examiner

METHOD, DEVICE AND SYSTEM FOR CONFIGURING DEVICE PARAMETERS IN DIGITAL SUBSCRIBER LINE ACCESS NETWORK

CROSS REFERENCE

This application is a continuation of U.S. patent application Ser. No. 12/245,864, filed on Oct. 6, 2008, which is a continuation of International Patent Application No. PCT/CN2007/001089, filed on Apr. 4, 2007. The International Application claims priority to Chinese Patent Application No. 200610060259.0, filed on Apr. 7, 2006, and Chinese Patent Application No. 200610061718.7, filed on Jul. 17, 2006. The afore-mentioned patent applications are hereby incorporated by reference in their entireties.

FIELD OF THE INVENTION

The present invention relates to Digital Subscriber Line (DSL) access technical field, and more particularly, to method for configuring device parameters in DSL access network, and to DSL access system and device.

BACKGROUND

Figure 1:
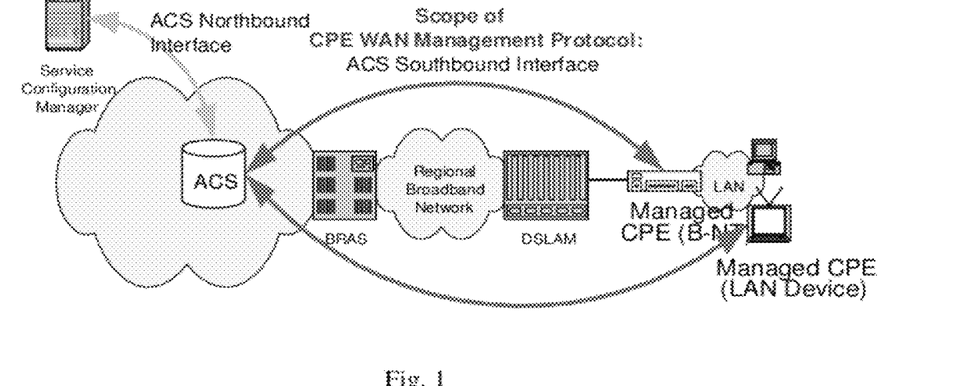
FIG. 1 is a schematic diagram illustrating DSL networking in prior art and connection relationship of a ACS and a CPE in the network.

FIG. 1 shows a typical networking diagram for DSL, which as a broadband access technology has been widely used. The DSL technology further promotes broadband technology applications in a wide range, such as Internet Protocol Television (IPTV), Voice over Internet Protocol (VoIP) and so on, and forms various types of IP-based devices for these applications or combinations of these applications, such as an IP application terminal (referred to as device hereafter) named Customer Premises Equipment (CPE). In a DSL network including a CPE as shown in FIG. 1, an Auto-configuration Server (ACS) is responsible to automatically configure the CPE so that the CPE may normally operate without being configured by a user. The ACS modifies and sets parameters of the CPE through a Remote Procedure Call (RPC) process.

In FIG. 1, a typical modification on device parameters includes two steps: modifying values of parameters (or adding, deleting parameters), and applying new parameters. When modified device parameters need to be applied, there may be two cases: one case is that the new parameters may be applied immediately after being modified; the other case is that the new parameters may not be applied until the device satisfies a certain condition, such as reset of the device or the current service, at this time, the new parameters may not be applied until the device is reset or the current service is reset.

A process for modifying device parameters typically includes the following steps:

1. A managing end (for example, a managing server, a command line terminal, and so on) sends a parameter modifying command (or message) to a managed device, the command typically includes information relevant to parameters to be modified, such as parameter names, new parameter values, and possibly includes authentication information for authenticating the validity of the managing end.

2. The managed device modifies specified parameters according to the information in the parameter modifying command after receiving the command.

3. The managed device returns a result of the parameters modification to the managing end after modifying the specified parameters according to the received command, the result including whether the new parameters may be applied immediately. If the new parameters may not be applied immediately, the managed device may apply the new parameters through necessary measures such as reset, and then the modification of parameters is completed.

4. The managed device returns information indicating modification failure to the managing end if the managed device fails to modify the parameters according to the received command.

The typical parameters modifying steps are described above. The applying new parameters in step 3 may not be performed by the device autonomously, but may be performed according to an additional command (or message) sent from the managing end, this depends on particular implementations.

DSL forum proposes a series of TR technical documents on a basis of a center standard TR-069 with respect for CPE. The series of TR technical documents defines operating frames for device management and auto-configuration based on HTTP protocol, and specifies a RPC approach for modifying CPE parameters at an ACS.

The existing techniques for modifying device parameters are illustrated above, and the parameters modifying process proposed in TR-069 is substantially the same. An ACS sends a SetParameterValues (or AddObject, DeleteObject) message to a CPE, the CPE performs subsequent operations for modifying parameters according to information in the message, and sends a response to the ACS when the parameters modification is completed or failed.

Taking the SetParameterValues message as an example, the message includes parameters as shown in the following table.

| Parameter | Type | Description |
| --- | --- | --- |
| ParameterList | ParameterValueStruct[ ] | An array of name-value pairs, each name-value pair indicates the CPE to set a parameter corresponding to the name into the value. |
| ParameterKey | string(32) | This is used to set ParameterKey parameter. The CPE need set ParameterKey into a value specified in this parameter when and only when the SetParameterValues is performed successfully and no error response is generated. If the SetParameterValues is not performed successfully (i.e., the request for modifying parameter values is not applied), the value of ParameterKey may not be modified. The ParameterKey provides the ACS with a flexible and extendable approach to track the modifications made by the ACS. The value of this parameter may be determined by the ACS, or may be empty. |

After receiving the SetParameterValues message, the CPE modifies specified parameters of the CPE according to the content of the ParameterList parameter. As pointed out in TR-069, whether new parameters are applied immediately after the modification of the parameters should be determined by the CPE rather than determined by the ACS though sending a command. Moreover, according to the specification of TR-069, the ACS cannot request the CPE to reset for applying the new parameters after the ACS invokes the SetParameterValues (or AddObject, DeleteObject) approach for the CPE. The CPE decides by itself how and when to apply the new parameters and the CPE may apply the new parameters so as to complete upgrade under the condition of not influencing online service.

There are two defects in above mentioned case:

1. The ACS cannot decide the applying opportunity of the CPE's unapplied parameters.

2. The ACS cannot inquire or change the applying opportunity of the CPE's unapplied parameters.

SUMMARY

The technical problem to be solved by the invention relates to above two defects, directed to which the present invention provides a method for configuring device parameters in a Digital Subscriber Line access network, a Digital Subscriber Line access system, and a network device, in which an applying opportunity of unapplied parameters of a managed device may be decided by a managing device, and also may be inquired and modified by the managing device.

An embodiment of method for configuring device parameters in a Digital Subscriber Line access network is provided, the method includes:

A. sending a parameter modifying command from a managing device to a managed device;

B. making a response to the parameter modifying command and modifying parameters by the managed device;

C. obtaining an applying opportunity of unapplied parameters by the managed device; and D. applying the unapplied parameters according to the applying opportunity by the managed device.

An embodiment of Digital Subscriber Line access system including a managing device and a managed device is provided. The managing device is adapted to send a parameter modifying command or a parameter applying opportunity command to the managed device, wherein the parameter modifying command or the parameter applying opportunity command includes an applying opportunity flag or applying opportunity condition for deciding an applying opportunity of unapplied parameters.

The managed device is adapted to modify parameters in response to the parameter modifying command or the parameter applying opportunity command from the managing device, and obtain the applying opportunity of the unapplied parameters from the parameter modifying command or the parameter applying opportunity command, and apply the unapplied parameters according to the applying opportunity.

An embodiment of Digital Subscriber Line access system including a managing device and a managed device is provided. The managing device is adapted to send a parameter modifying command to the managed device.

The managed device is adapted to modify parameters in response to the parameter modifying command from the managing device, obtain an applying opportunity of unapplied parameters from an applying opportunity flag or applying opportunity condition, which decides the applying opportunity of the unapplied parameters, in a data model stored in the managed device, and apply the unapplied parameters according to the applying opportunity.

An embodiment of network device in a Digital Subscriber Line access network is provided, the network device includes a command sending unit adapted to send a parameter modifying command or a parameter applying opportunity command to a managed device.

Another embodiment of network device in a Digital Subscriber Line access network is provided, the network device includes:

a command responding unit adapted to modify parameters in response to a parameter modifying command or a parameter applying opportunity command sent from a managing device; and a parameter handling unit adapted to obtain an applying opportunity of unapplied parameters from the parameter modifying command or the parameter applying opportunity command, and apply the unapplied parameters according to the applying opportunity.

A third embodiment of network device in a Digital Subscriber Line access network is provided, the network device includes:

a command responding unit adapted to modify parameters in response to a parameter modifying command or a parameter applying opportunity command sent from a managing device; and a storing unit adapted to store a data model which includes an applying opportunity flag or applying opportunity condition for deciding an applying opportunity of unapplied parameters, and a parameter handling unit adapted to obtain the applying opportunity of the unapplied parameters from the applying opportunity flag or applying opportunity condition in the data model stored in the storing unit, and apply the unapplied parameters according to the applying opportunity.

The advantageous technical effect resulting from the embodiments of the present invention lies in that: above mentioned two problems in prior art are directed to be solved; an applying opportunity flag, which indicates an applying opportunity of unapplied parameters, is included in a parameter modifying command sent from a managing device or is included in a data model of a managed device, so that the managing device may decide the applying opportunity of the unapplied parameters of the managed device through modifying the applying opportunity flag, and may also inquire and modify the applying opportunity of the unapplied parameters of the managed device.

DETAILED DESCRIPTION

A further detailed description for embodiments of the present invention is provided hereafter in conjunction with the drawings.

Figure 2:
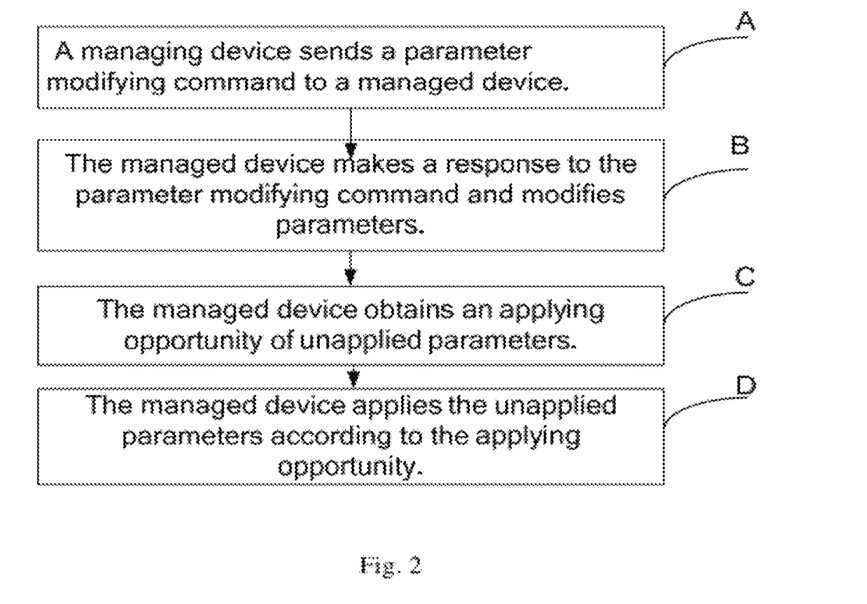
FIG. 2 is a flowchart diagram illustrating a method according to a first embodiment of the present invention.

The general technical solution for solving above mentioned technical problems according to the present invention may include four steps as particularly shown in FIG. 2: A. a managing device (ACS) sends a parameter modifying command to a managed device (CPE); B. the managed device (CPE) makes a response to the parameter modifying command and modifies parameters; C. the managed device (CPE) obtains an applying opportunity of unapplied parameters; and D. the managed device (CPE) applies the unapplied parameters according to the applying opportunity of the unapplied parameters.

In the particular implementation of step C, the managed device may obtain the applying opportunity of the unapplied parameters from an applying opportunity flag, which decides the applying opportunity of the unapplied parameters, set in the parameter modifying command; may obtain the applying opportunity of the unapplied parameters from an applying opportunity flag, which decides the applying opportunity of the unapplied parameters, set in a data model of the managed device; and may also obtain the applying opportunity of the unapplied parameters from an parameter applying opportunity command, which decides the applying opportunity of the unapplied parameters, sent directly from the managing device, the parameter applying opportunity command directly decides the applying opportunity of the unapplied parameters.

Parameters may be applied in several manners according to particular implementation requirements: applying immediately, when a certain condition is satisfied, or at any time. Therefore, in an embodiment of the present invention, the applying opportunity may be an applying opportunity flag, i.e., a flag is used to indicate whether new parameters (new modified or new set parameters) need to be applied; further, the applying opportunity may be an applying opportunity condition, i.e., a condition is used to indicate what condition should be satisfied by the managed device before new parameters may be applied.

In an embodiment of the present invention, an applying opportunity flag or an applying opportunity condition, which decides applying opportunity of unapplied parameters, need to be set in a parameter modifying command of the managing device, so that the managed device may obtain the applying opportunity of new parameters from the applying opportunity flag or the applying opportunity condition set in the parameter modifying command.

In another embodiment of the present invention, an applying opportunity flag or an applying opportunity condition, which decides applying opportunity of unapplied parameters, may be set in a data model of the managed device, so that the managed device may obtain the applying opportunity from the applying opportunity flag or the applying opportunity condition set in the data model. Alternatively, a parameter applying opportunity command containing an applying opportunity of unapplied parameters may be sent directly by the managing device. An applying opportunity flag or an applying opportunity condition, which decides the applying opportunity of unapplied parameters, may be set in the parameter applying opportunity command, so that the managed device may obtain the applying opportunity from the applying opportunity flag or the applying opportunity condition set in the parameter applying opportunity command sent from the managing device.

The applying opportunity may also be an opportunity indicating that new parameters should be applied immediately.

For example, in an embodiment of the present invention, an applying opportunity flag ApplyDelayTime is added into the parameter modifying command sent from the ACS to the CPE, and the applying opportunity flag indicates whether unapplied parameters should be applied immediately. The ACS may decide the applying opportunity of the CPE's unapplied parameters through this flag, and the CPE handles the unapplied parameters according to the applying opportunity flag.

When the applying opportunity is an opportunity for applying parameters immediately, firstly it is determined according to the applying opportunity whether the modified parameters are applied immediately. If the modified parameters are not applied immediately, a time window is given to request applying the modified parameters within a period specified by the time window; in practice, the period may be infinite.

If the modified parameters are not applied within the period specified by the time window, the user is prompted to manually apply the modified parameters or the CPE automatically enforces the application of the modified parameters, or alternatively a failure may be returned.

In the present embodiment, the applying opportunity flag ApplyDelayTime may be sent from the ACS to the CPE via a RPC command, and the CPE may determine the applying opportunity of the CPE's unapplied parameters according to the flag.

Different implement manners are described in various embodiments of the present invention. For example, an applying opportunity flag ApplyDelayTime, which is set in a parameter modifying command sent from the ACS to the CPE via a RPC command, may be used to indicate an applying opportunity of the CPE's unapplied parameters. In a first embodiment, the applying opportunity flag decides the applying opportunity of the CPE's unapplied parameters which are generated by the corresponding command. In a second embodiment, the applying opportunity flag decides the applying opportunity of all the CPE's unapplied parameters. In a third embodiment, the applying opportunity flag decides the applying opportunity of the CPE's all unapplied parameters which are modified by the ACS. In a fourth embodiment, the applying opportunity flag decides the applying opportunity of the CPE's unapplied parameters which are generated by a specified session between the ACS and the CPE.

The ACS may also set and modify an applying opportunity of the CPE's unapplied parameters by means of adding a new command. For example, a command SetApplyDelayTime is newly added to transfer an ApplyDelayTime flag to the CPE, and the CPE may decide an applying opportunity of the CPE's unapplied parameters according to the ApplyDelayTime flag. In a first embodiment, the flag decides the applying opportunity of the CPE's unapplied parameters which are generated by a specified command sent from the ACS. In a second embodiment, the flag decides the applying opportunity of all the CPE's unapplied parameters. In a third embodiment, the flag decides the applying opportunity of the CPE's all unapplied parameters which are generated by commands from the ACS. In a fourth embodiment, the flag decides the applying opportunity of the CPE's unapplied parameters which are generated by a specified session between the ACS and the CPE.

The ACS may also inquire an applying opportunity of the CPE's unapplied parameters by means of adding a new command. For example, a command GetApplyDelayTime is newly added to get the applying opportunity of the CPE's unapplied parameters. In a first embodiment, the flag decides the applying opportunity of the CPE's unapplied parameters which are generated by a specified command sent from the ACS. In a second embodiment, the flag decides the applying opportunity of all the CPE's unapplied parameters. In a third embodiment, the flag decides the applying opportunity of the CPE's all unapplied parameters which are generated by commands from the ACS. In a fourth embodiment, the flag decides the applying opportunity of the CPE's unapplied parameters which are generated by a specified session between the ACS and the CPE.

Figure 3:
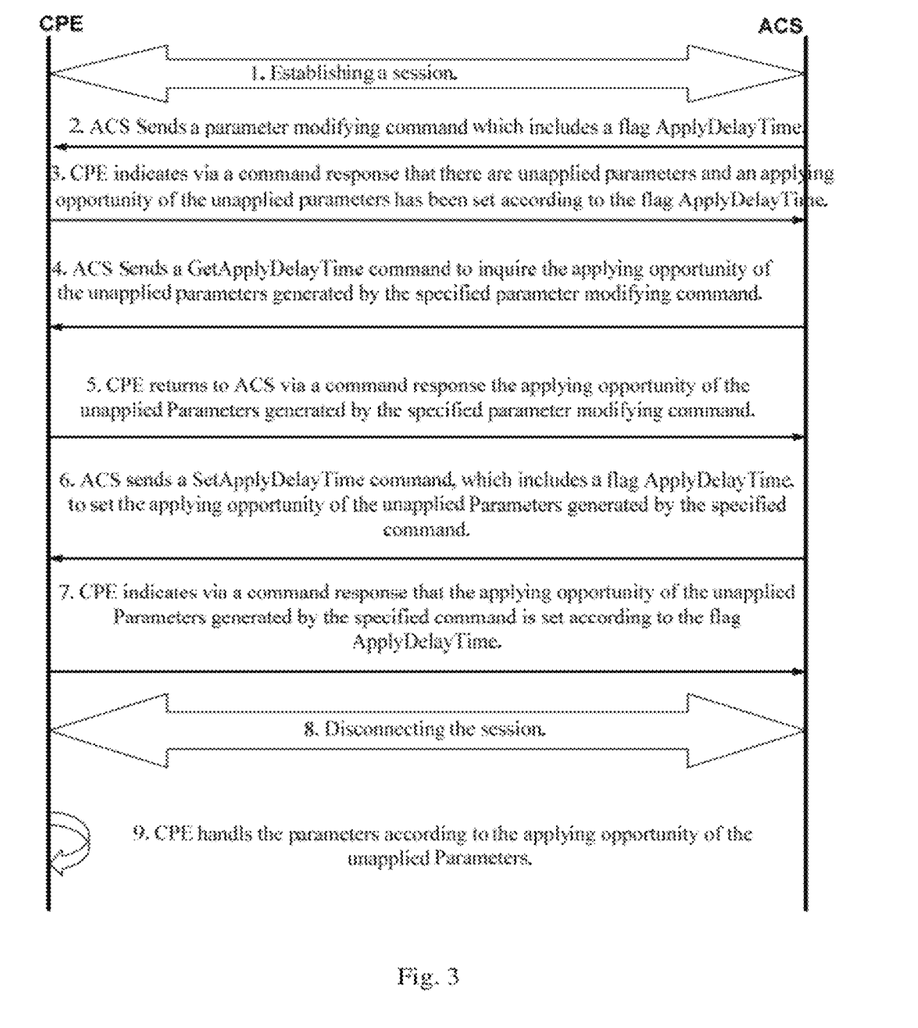
FIG. 3 is a flowchart diagram illustrating a method according to a second embodiment of the present invention.

The process for setting, inquiring and modifying an applying opportunity of unapplied parameters according to a detailed embodiment will be described in conjunction with the flowchart diagram of FIG. 3. In this specific implementation, a flag ApplyDelayTime decides an applying opportunity of a CPE's unapplied parameters which are generated by a specified command sent from an ACS.

Step 1: The ACS establishes a session with the CPE. The session between the ACS and the CPE refers to a procedure, in which the ACS may send a series of commands including possibly multiple parameter modifying commands to the CPE after the ACS establishes connection with the CPE, and the ACS disconnects from the CPE after these commands are performed. Such a procedure is called a session.

Step 2: The ACS sends a parameter modifying command to the CPE to modify the CPE's parameters. The parameter modifying command includes a flag ApplyDelayTime, which decides the applying opportunity of the CPE's unapplied parameters which are generated by this parameter modifying command.

Step 3: The CPE indicates via a command response that unapplied parameters are generated by this parameter modifying command and the applying opportunity of the unapplied parameters generated by this parameter modifying command is set according to the flag ApplyDelayTime in the parameter modifying command from the ACS.

Step 4: The ACS sends a GetApplyDelayTime command to inquire the applying opportunity of the unapplied parameters generated by the specified parameter modifying command.

Step 5: The CPE returns to the ACS via a command response the applying opportunity of the unapplied parameters generated by the specified parameter modifying command in response to the inquiry from the ACS.

Step 6: The ACS sends a SetApplyDelayTime command to the CPE to modify the applying opportunity of the CPE's unapplied parameters which are generated by the specified parameter modifying command. The SetApplyDelayTime command includes a flag ApplyDelayTime, which decides the applying opportunity of the CPE's unapplied parameters which are generated by the specified parameter modifying command.

Step 7: The CPE indicates via a command response that the applying opportunity of the unapplied parameters generated by the specified command is set according to the flag ApplyDelayTime in the SetApplyDelayTime command from the ACS.

Step 8: The session between the ACS and the CEP is disconnected.

Step 9: The applying opportunity of the CPE's unapplied parameters generated by a certain parameter modifying command is met, and the CPE applys these unapplied parameters according to a parameter applying strategy.

For the purpose of illustrating the technical details of the particular implementation, the SetParameterValues as one of parameter modifying commands in the DSL Forum (DSLF) is taken as an example, the message includes the following parameters:

| Parameter | Type | Description |
| --- | --- | --- |
| ParameterList | ParameterValueStruct[ ] | An array of name-value pairs, each name-value pair indicates that a CPE should set a parameter corresponding to the name into the value. |
| ParameterKey | string(32) | It is used to set a ParameterKey parameter. The CPE needs set ParameterKey into a value specified in this parameter when and only when the SetParameterValues command is performed successfully and no error response is generated. If the SetParameterValues command is not performed successfully (indicating that the request for modifying parameter values is not applied), the value of ParameterKey may not be modified. The ParameterKey provides an ACS with a flexible and extendable approach to track the modifications made by the ACS. The value of this parameter may be determined by the ACS, or may be empty. |

After receiving the SetParameterValues message, the CPE modifies specified parameters of the CPE according to the content of the parameterList parameter.

In a first embodiment, the applying opportunity flag decides the applying opportunity of the CPE's unapplied parameters which are generated by this current SetParameterValues command, and the particular implementation is as follows:

An EffectiveNow parameter (flag) is added into the SetParameterValues command, and the SetParameterValues command containing the added parameter includes the following parameters:

| Parameter | Type | Description |
|---|---|---|
| ParameterList | ParameterValueStruct[ ] | An array of name-value pairs, each name-value pair indicates that a CPE should set a parameter corresponding to the name into the value. |
| ParameterKey | string(32) | It is used to set a ParameterKey parameter. The CPE needs set ParameterKey into a value specified in this parameter when and only when the SetParameterValues command is performed successfully and no error response is generated. If the SetParameterValues command is not performed successfully (indicating that the request for modifying parameter values is not applied), the value of ParameterKey may not be modified. The ParameterKey provides an ACS with a flexible and extendable approach to track the modifications made by the ACS. The value of this parameter may be determined by the ACS, or may be empty. |
| EffectiveNow | Int(0:1) | It indicates whether the current modified parameters should be applied immediately.<br>0 - The CPE decides when to apply new parameters according to device conditions, but the new parameters should be applied within a certain period such as 24 hours, beyond which it may be chosen to apply the new parameters automatically and unconditionally or prompt the user in some manner to employ manual intervention to apply the new parameters.<br>1 - The device need apply the new parameters immediately after the parameters are modified, irrespective of employing what specific approach. |

In practical implementation, for example, when the EffectiveNow in above table is 0, in the case that the CPE cannot apply new parameters for some reason within a certain period (for example 24 hours) after the CPE completes the parameters modification, the user is informed of this case and the applicable manual interventions through voice/sound prompt, screen text/character prompt, the user's electronic mailbox, the user's other terminals with short messaging function, and other communication systems commonly used by users and supported by operators. The device may also actively switch state to enforce the application of the new parameters after the certain period is exceeded.

Users using different managed devices may be informed in different manners. For example, a user using a VoIP device may be informed via voice immediately after an off-hook act that what operations may be performed by the user to apply the new parameters, alternatively the user may be informed of some special prompt sound and may get from a user manual the operations to be performed after hearing such prompt sound. A user using a CPE with display screen may be informed via text on the screen that what operations may be performed by the user to apply the new parameters, alternatively the user may be informed of some special characters and may get from a user manual the operations to be performed after seeing such special characters. The user may also register an Email address or a telephone number of another terminal equipment such as a mobile telephone with short messaging function when opening an account for a CPE. When the above event occurs, the operator may send an Email to the Email address registered by the user or send a short message to the telephone number registered by the user, informing the user of applicable operations.

Figure 5:
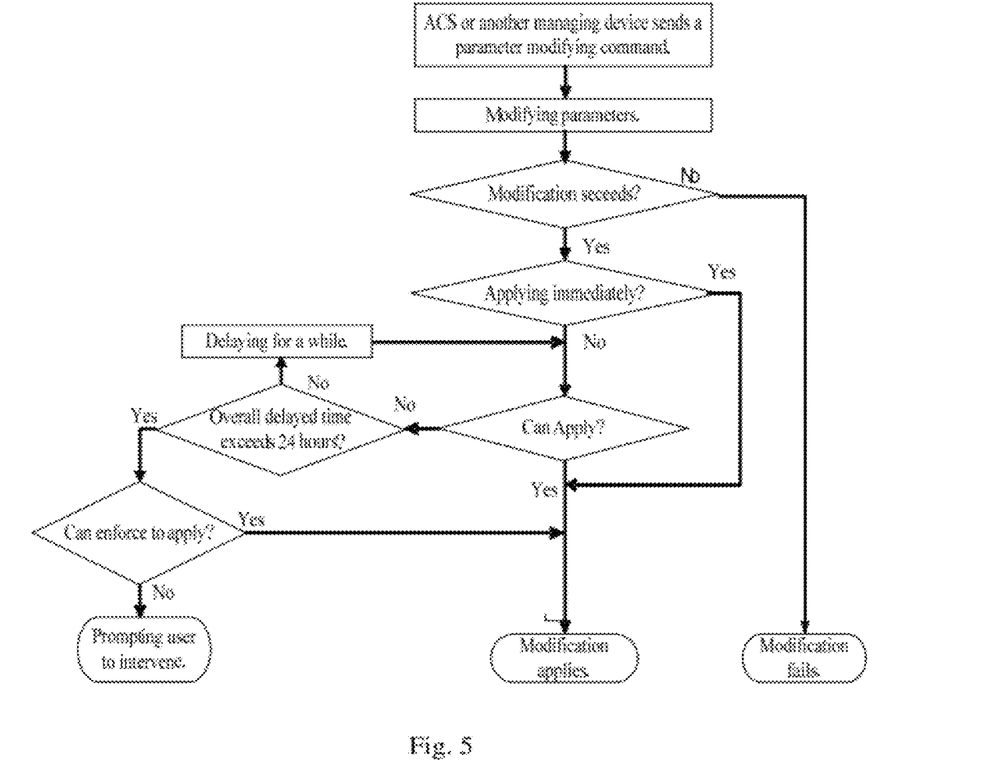
FIG. 5 is a control flowchart for modifying device parameters and applying the modified parameters immediately according to the second embodiment of the present invention.

FIG. 5 shows the process for modifying device parameters and applying the modified parameters, including the following steps of:

1. An ACS or another managing device sends a parameter modifying command, the parameter modifying command typically includes information relevant to parameters to be modified, such as parameter names, new parameter values, or authentication information for authenticating the validity of the ACS or another managing device, and includes an EffectiveNow (applying immediately) parameter.

2. A CPE or another managed device modifies parameters after receiving the parameter modifying command. If the modification fails, a failure information is fed back to the ACS or managing device and the process is terminated, if the modification succeeds, the process proceeds to step 3.

3. It is determined whether the modified parameters should be applied immediately. If the modified parameters should be applied immediately, the modified parameters are applied directly; otherwise, the application of the modified parameters is delayed.

4. It is determined whether the delayed time for applying the modified parameters exceeds 24 hours. If the delayed time exceeds 24 hours, it is determined whether the application of the modified parameters may be enforced. If the application of the modified parameters may be enforced, the modified parameters are applied directly; otherwise, the user is prompted to make intervention in order to apply the modified parameters.

It should be noted that, the process for responding and authenticating the entity which sends the parameter modifying command/message is not included in FIG. 2. The managed device may authenticate the managing end. If the authentication fails, the parameters modification is not performed and failure information or nothing is fed back to the managing device.

"Can apply?" as shown in FIG. 5 is determined by the CPE based on its own condition. It is possible that the modified parameters may be applied as long as the CPE is running, so that there actually does not exist the node for determining whether the modified parameters can be applied and the nodes following its negative branch in the flowchart.

"Overall delayed time exceeds 24 hours?" as shown in FIG. 5 is just taken as an example; the delayed time may not be 24 hours. New parameters may wait respective periods of time rather than an overall delayed time for being applied.

"Can enforce to apply?" as shown in FIG. 5 refers to the new parameters are enforced to be applied irrespective of the device condition in the case of overtime. This feature may be omitted, that is to say, the new parameters cannot be enforced to be applied without the device's permission even if the delayed time is exceeded. The feature of enforcing to apply does not indicate whether new parameters should be applied immediately.

"User is prompted to intervene" as shown in FIG. 5 refers to prompt the user that the parameters have been modified and some appropriate operations need be performed to apply the modified parameters. Various manners for prompting as described above may be employed.

"Modification fails" as shown in FIG. 5 is just a result need to be informed to an ACS or other entity which sends the command/message. This information need not be prompted in the CPE since the user does not care about it.

In the present embodiment, by means of employing a flag EffectiveNow for deciding whether to apply new parameters immediately, on the one hand, it may discriminate a case in which a device may be reset unconditional from a case in which the device may not be reset until a certain condition is satisfied, so that the necessity for manual intervention by the user is eliminated in the situation that the device is required to apply new parameters immediately when the parameters are modified for the device after the user applies for new service from the operator, on the other hand, the manufactory may be more flexible for some requirements of device performance when providing parameter modifying functions. Moreover, when parameters modification is performed normally, the user may be informed under the condition that the user's online service is not interrupted unintentionally by means of various prompting measures, and take corresponding operations to make the device update, avoiding the case of new parameters being not applied for a long time.

In a second embodiment, the applying opportunity flag decides the applying opportunity of all the CPE's unapplied parameters. In the particular command, a parameter (flag) is added as the first embodiment. The difference is that the parameter is used to decide the applying opportunity of all the CPE's unapplied parameters. The details are shown as follows.

| Parameter | Type | Description |
| --- | --- | --- |
| ParameterList | ParameterValueStruct[ ] | An array of name-value pairs, each name-value pair indicates that a CPE should set a parameter corresponding to the name into the value. |
| ParameterKey | string(32) | It is used to set a ParameterKey parameter. The CPE needs set ParameterKey into a value specified in this parameter when and only when the SetParameterValues command is performed successfully and no error response is generated. If the SetParameterValues command is not performed successfully (indicating that the request for modifying parameter values is not applied), the value of ParameterKey may not be modified. The ParameterKey provides an ACS with a flexible and extendable approach to track the modifications made by the ACS. The value of this parameter may be determined by the ACS, or may be empty. |
| EffectiveNow | Int(0:1) | It indicates whether all the CPE's unapplied parameters should be applied immediately after the current parameter modifying command is performed. 0 - The CPE decides when to apply new parameters according to device conditions, but the new parameters should be applied within a certain period such as 24 hours, beyond which it may be chosen to apply the new parameters automatically and unconditionally or prompt the user in some manner to employ manual intervention to apply the new parameters. 1 - The device need apply all the CPE's unapplied parameters immediately after the current parameters modification is completed, irrespective of employing what specific approach. |

In a third embodiment, the applying opportunity flag decides the applying opportunity of the CPE's all unapplied parameters which are generated through modifications by the ACS. In the particular command, a parameter (flag) is added as the first embodiment. The difference is that the parameter is used to decide the applying opportunity of the CPE's all unapplied parameters which are generated through modifications by the ACS. The details are shown as follows.

| Parameter | Type | Description |
|---|---|---|
| ParameterList | ParameterValueStruct[ ] | An array of name-value pairs, each name-value pair indicates that a CPE should set a parameter corresponding to the name into the value. |
| ParameterKey | string(32) | It is used to set a ParameterKey parameter. The CPE needs set ParameterKey into a value specified in this parameter when and only when the SetParameterValues command is performed successfully and no error response is generated. If the SetParameterValues command is not performed successfully (indicating that the request for modifying parameter values is not applied), the value of ParameterKey may not be modified. The ParameterKey provides an ACS with a flexible and extendable approach to track the modifications made by the ACS. The value of this parameter may be determined by the ACS, or may be empty. |
| EffectiveNow | Int(0:1) | It indicates whether the CPE's all unapplied parameters generated through modifications by the ACS should be applied immediately after the current parameter modifying command is performed. 0 - The CPE decides when to apply new parameters according to device conditions, but the new parameters should be applied within a certain period such as 24 hours, beyond which it may be chosen to apply the new parameters automatically and unconditionally or prompt the user in some manner to employ manual intervention to apply the new parameters. 1 - The device need apply the CPE's all unapplied parameters generated through modifications by the ACS immediately after the current parameters modification is completed, irrespective of employing what specific approach. |

In a fourth embodiment, the applying opportunity flag decides the applying opportunity of the CPE's all unapplied parameters generated through a specified session between the ACS and the CPE. In the particular command, a parameter (flag) is added as the first embodiment. The difference is that the parameter is used to decide the applying opportunity of the CPE's all unapplied parameters generated through a specified session between the ACS and the CPE. The details are shown as follows.

| Parameter | Type | Description |
|---|---|---|
| ParameterList | ParameterValueStruct[ ] | An array of name-value pairs, each name-value pair indicates that a CPE should set a parameter corresponding to the name into the value. |
| ParameterKey | string(32) | It is used to set a ParameterKey parameter. The CPE needs set ParameterKey into a value specified in this parameter when and only when the SetParameterValues command is performed successfully and no error response is generated. If the SetParameterValues command is not performed successfully (indicating that the request for modifying parameter values is not applied), the value of ParameterKey may not be modified. The ParameterKey provides an ACS with a flexible and extendable approach to track the modifications made by the ACS. The value of this parameter may be determined by the ACS, or may be empty. |
| EffectiveNow | Int(0:1) | It indicates whether the CPE's all unapplied parameters generated through a specified session between the ACS and the CPE should be applied |

| Parameter | Type | Description |
|---|---|---|
| | | immediately after the current parameter modifying command is performed.<br>0 - The CPE decides when to apply new parameters according to device conditions, but the new parameters should be applied within a certain period such as 24 hours, beyond which it may be chosen to apply the new parameters automatically and unconditionally or prompt the user in some manner to employ manual intervention to apply the new parameters.<br>1 - The device need apply the CPE's all unapplied parameters generated through a specified session between the ACS and the CPE immediately after the current parameters modification is completed, irrespective of employing what specific approach. |

Another technical solution of the present invention is that: an ApplyDelayTime flag is added in a data model of a CPE. This flag in the data model of the CPE may be modified by an ACS through RPC approach, and the CPE may decide the applying opportunity of the CPE's unapplied parameters according to this flag. This technical solution may be implemented in four embodiments.

In a first embodiment, multiple ApplyDelayTime flags are included in the data model of the CPE, each ApplyDelayTime flag corresponds to a RPC command sent from the ACS to the CPE, unapplied parameters are generated during the CPE executes the RPC command, and the ApplyDelayTime flag decides the applying opportunity of the CPE's unapplied parameters generated by the RPC command. In a second embodiment, one ApplyDelayTime flag is included in the data model of the CPE, and the ApplyDelayTime flag decides the applying opportunity of all the CPE's unapplied parameters. In a third embodiment, one ApplyDelayTime flag is included in the data model of the CPE, and the ApplyDelayTime flag decides the applying opportunity of the CPE's all unapplied parameters generated by ACS commands. In a fourth embodiment, multiple ApplyDelayTime flags are included in the data model of the CPE, each ApplyDelayTime flag corresponds to a session between the ACS and the CPE, unapplied parameters are generated during the CPE executes the commands of the session, and the ApplyDelayTime flag decides the applying opportunity of the CPE's unapplied parameters generated through the corresponding session between the ACS and the CPE.

The ACS may set and modify the applying opportunity of the CPE's unapplied parameters through a RPC approach. The ACS may send a parameter modifying command/message to the CPE to modify parameters, and then the ACS may modify the ApplyDelayTime flag in the data model of the CPE through the RPC approach, so as to indicate the CPE to decide the applying opportunity of the CPE's unapplied parameters according to the ApplyDelayTime flag. For example, the value of the ApplyDelayTime flag in the data model of the CPE may be set through an existing RPC command SetParameterValues.

The ACS may inquire the applying opportunity of the CPE's unapplied parameters through the RPC approach. For example, the value of the ApplyDelayTime flag in the data model of the CPE may be obtained through an existing RPC command GetParameterValues.

After the ACS modifies the ApplyDelayTime flag in the data model of the CPE, the ACS may also request, through a RPC command, the CPE to handle the CPE's unapplied parameters according to the flag in the data model. For example, a new command ApplyTheChange may be added to request the CPE to handle the CPE's unapplied parameters according to the ApplyDelayTime flag in the data model.

Figure 4:
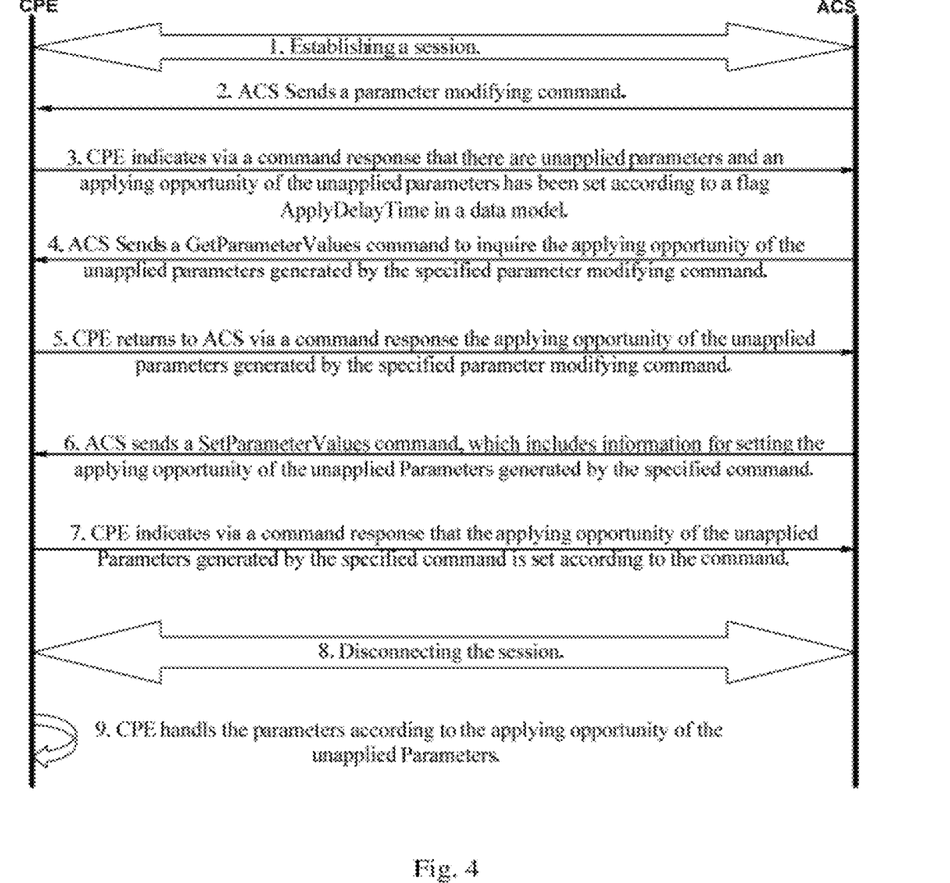
FIG. 4 is a flowchart diagram illustrating a method according to a third embodiment of the present invention.

The process for setting, inquiring and modifying the applying opportunity of unapplied parameters is described in the following with reference to the flowchart diagram of FIG. 4. In a particular embodiment, multiple ApplyDelayTime flags may be included in the data model of the CPE, each ApplyDelayTime flag corresponds to a RPC command sent from the ACS to the CPE, unapplied parameters are generated during the CPE executes the RPC command, and the ApplyDelayTime flag decides the applying opportunity of the CPE's unapplied parameters generated by the RPC command.

Step 1: An ACS establishes a session with a CPE.

Step 2: The ACS sends a parameter modifying command to the CPE to modify the CPE's parameters.

Step 3: The CPE indicates, through a command response, that unapplied parameters are generated by this parameter modifying command, and the applying opportunity of the unapplied parameters generated by this parameter modifying command has been set according to the ApplyDelayTime flag in the data model of the CPE.

Step 4: The ACS sends a GetParameterValues command to inquire the applying opportunity of the unapplied parameters generated by the specified parameter modifying command.

Step 5: The CPE returns to the ACS, through a command response, the applying opportunity of the unapplied parameters generated by the specified parameter modifying command in response to the inquiry from the ACS.

Step 6: The ACS sends a SetParameterValues command to the CPE to modify the applying opportunity of the CPE's unapplied parameters generated by the specified parameter modifying command. The SetParameterValues command includes information for setting the applying opportunity of the unapplied parameters generated by the specified parameter modifying command.

Step 7: The CPE indicates, through a command response, that the applying opportunity of the unapplied parameters generated by the specified parameter modifying command has been set according to the SetParameterValues command.

Step 8: The session between the ACS and the CPE is disconnected.

Step 9: When the applying opportunity of the CPE's unapplied parameters generated by a certain parameter modifying command is met, the CPE applies these unapplied parameters according to a parameter applying strategy.

The so called data model means that the CPE need provide parameters which may be accessed by the ACS in a tree structure manner, in order to facilitate the ACS's management on the CPE. The data model employs a hierarchical structure like directory tree structure. A particular parameter name is composed of a series of hierarchical nodes which are separated by "." (dots), beginning at the hierarchical root and deriving branches gradually. This is similar as a file directory tree in the Windows system, where an Object in the data model is similar as a directory in the file directory tree, and a Parameter in the data model is similar as a file in the file directory tree.

A fragment of the data model is provided in the following.

| name | type | writable | readable | description |
|---|---|---|---|---|
| InternetGateway-Device. | object | —[3] | R[4] | It is a root object of an Internet gateway device. |
| LANDevice-NumberOfEntries | unsignedInt | — | R | The number of LANDevice entities. |
| WANDevice-NumberOfEntries | unsignedInt | — | R | The number of WANDevice entities. |
| InternetGateway-Device.DeviceInfo. | object | — | R | This object includes the universal parameters of Internet gateway. |

In above table, the InternetGatewayDevice is an object, the LANDeviceNumberOf-Entries is an integer type parameter under the InternetGatewayDevice, and the ACS accesses the parameter through the path of InternetGatewayDevice.LANDeviceNumberOfEntries.

{i} may be used in the data model to indicate that there exist multiple entities in a particular application, such as entity 1, entity 2, and so on.

For example, in a first embodiment, multiple ApplyDelayTime flags are included in the data model of the CPE, each ApplyDelayTime flag corresponds to a RPC command sent from the ACS to the CPE, unapplied parameters are generated during the CPE executes the RPC command, and the ApplyDelayTime flag decides the applying opportunity of the CPE's unapplied parameters generated by the RPC command.

The new added content in the data model is shown in bold fonts in the following table.

| name | type | writable | readable | description |
|---|---|---|---|---|
| InternetGateway-Device. | object | —[3] | R[4] | It is a root object of an Internet gateway device. |
| LANDevice-NumberOfEntries | unsignedInt | — | R | The number of LANDevice entities. |
| WANDevice-NumberOfEntries | unsignedInt | — | R | The number of WANDevice entities |
| InternetGateway-Device.Apply.{i} | object | — | R | This object includes applying opportunity of the device's unapplied parameters |
| KEY | string | — | R | It is used to index which ACS sends a command to the CPE. |
| ApplyDelayTime | unsignedInt | R | R | It is used to decide the applying opportunity of the unapplied parameters generated during the CPE executes the command. |
| InternetGateway-Device.DeviceInfo. | Object | — | R | This object includes the universal parameters of Internet gateway. |

Figure 6:
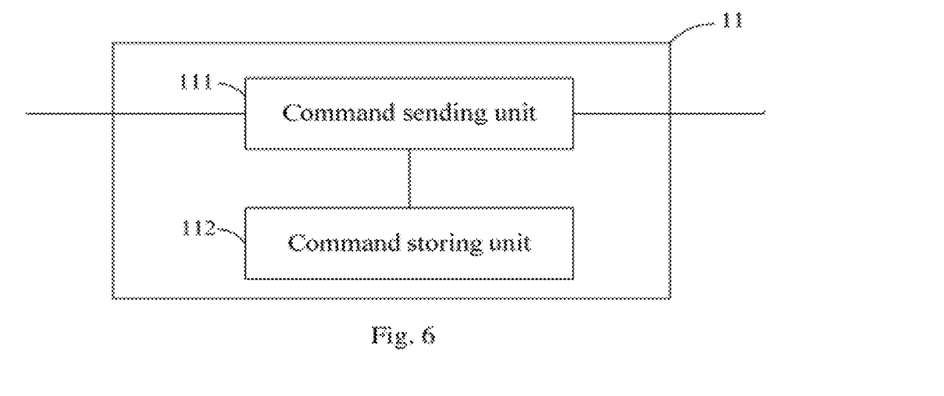
FIG. 6 is a block diagram illustrating a network device according to a first embodiment of the present invention.

The {i} of InternetGatewayDevice.Apply.{i} in above table indicates that there may exist multiple commands which generate unapplied parameters. Assuming that two commands generate unapplied parameters, the actual content of the data model may be:

InternetGatewayDevice.Apply 1.KEY
InternetGatewayDevice.Apply 1.ApplyDelayTime
InternetGatewayDevice.Apply.2.KEY
InternetGatewayDevice.Apply.2.ApplyDelayTime A network device in a DSL access network according to the invention may send to a managed device a command containing an applying opportunity of new parameters. The network device 11 of FIG. 6 includes:

a command sending unit 111 adapted to send to a managed device a parameter modifying command or a parameter applying opportunity command; and a command storing unit 112 adapted to store commands for managing the managed device, wherein the parameter modifying command or the parameter applying opportunity command includes an applying opportunity flag or applying opportunity condition for deciding the applying opportunity of unapplied parameters.

Figure 7:
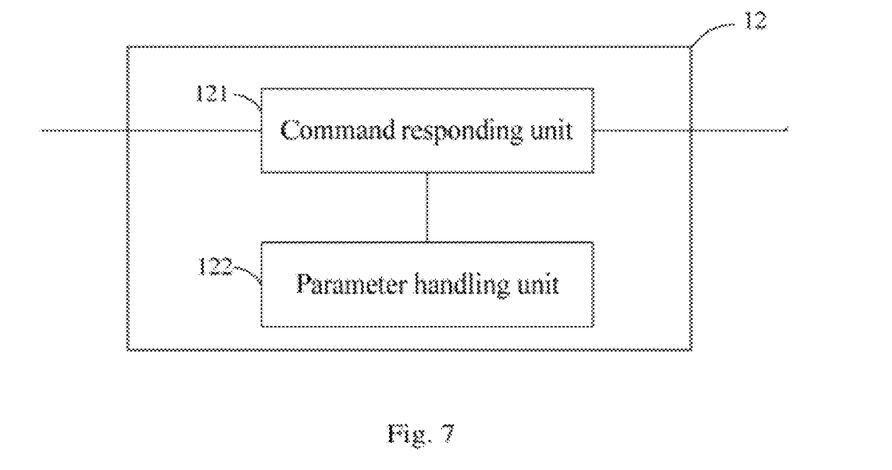
FIG. 7 is a block diagram illustrating a network device according to a second embodiment of the present invention.

A network device of FIG. 7 corresponding to that of FIG. 6 may modify or set parameters in response to the parameter modifying command from the network device 11 of FIG. 6. The network device 12 of FIG. 7 includes:

a command responding unit 121 adapted to modify parameters in response to the parameter modifying command or the parameter applying opportunity command from the managing device; and a parameter handling unit 122 adapted to obtain the applying opportunity of the unapplied parameters from the parameter modifying command or the parameter applying opportunity command, and apply the unapplied parameters according to the applying opportunity.

Figure 8:
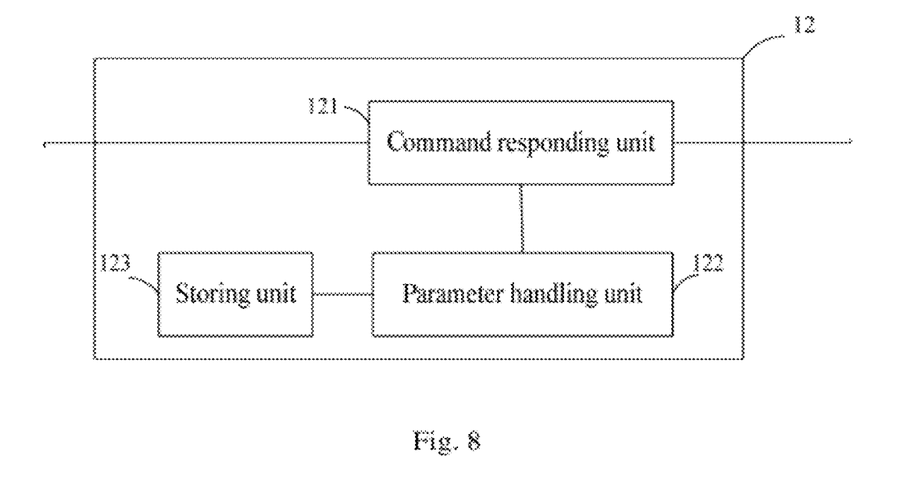
FIG. 8 is a block diagram illustrating a network device according to a third embodiment of the present invention.

The network device of FIG. 8 may also modify or set parameters in response to the parameter modifying command from the network device 11 of FIG. 6. The network device of FIG. 8 includes:

a command responding unit 121 adapted to modify parameters in response to the parameter modifying command or the parameter applying opportunity command from the managing device; and a storing unit 123 adapted to store a data model which includes an applying opportunity flag or applying opportunity condition for deciding the applying opportunity of the unapplied parameters, and a parameter handling unit 122 adapted to obtain the applying opportunity of the unapplied parameters from the applying opportunity flag or applying opportunity condition in the data model stored in the storing unit, and apply the unapplied parameters according to the applying opportunity.

Obviously, the device of FIG. 8 does not need the managing device to send a command carrying the applying opportunity of the unapplied parameters, and the applying opportunity of the unapplied parameters may be obtained from the data model stored in its own storing unit 123.

The details for implementing the device of the present invention have been described in preceding embodiments for implementing the method of the present invention, no further similar details are provide any more.

An embodiment of DSL access network according to the invention includes a managing device and a managed device. The managing device sends to the managed device a parameter modifying command or a parameter applying opportunity command, which includes an applying opportunity flag or applying opportunity condition for deciding the applying opportunity of unapplied parameters.

The managed device modifies parameters in response to the parameter modifying command or the parameter applying opportunity command from the managing device, and obtains the applying opportunity of the unapplied parameters from the parameter modifying command or the parameter applying opportunity command, and applies the unapplied parameters according to the applying opportunity.

Another embodiment of DSL access network according to the invention also includes a managing device and a managed device. The managing device sends to the managed device a parameter modifying command. The managed device modifies parameters in response to the parameter modifying command from the managing device, and obtains the applying opportunity of the unapplied parameters from an applying opportunity flag or applying opportunity condition, which decides the applying opportunity of the unapplied parameters, in the data model stored in the storing unit, and applies the unapplied parameters according to the applying opportunity.

The details for implementing the system of the present invention have been described in preceding embodiments for implementing the method of the present invention, no further similar details are provide any more. Preferred embodiments are described to illustrate the invention, however, it is apparent for those skilled in the art to make various modifications and variations on these embodiments without departing from the spirit and scope of the invention, such modifications and variations should be construed as falling into the protection scope of the invention.

What is claimed is:

1. A method for configuring device parameters in a Digital Subscriber Line access network performed by a managed device, comprising:
   receiving a parameter modifying command from a managing device;
   modifying a parameter according to the parameter modifying command;
   sending a first command response to the managing device, indicating an applying opportunity of an unapplied parameter of the managed device, which is generated by the parameter modifying command in response to the parameter modifying command;
   receiving a GetParameterValues command to inquire the applying opportunity of the unapplied parameter of the managed device, which is generated by the parameter modifying command from the managing device;
   sending a second command response to the managing device, indicating the applying opportunity of the unapplied parameter of the managed device, which is generated by the parameter modifying command in response to the GetParameterValues command;
   receiving a SetApplyParameterTime command to modify the applying opportunity of the unapplied parameter of the managed device, which is generated by the parameter modifying command from the managing device;
   sending a third command response to the managing device indicating that the applying opportunity of the unapplied parameter of the managed device, which is generated by the parameter modifying command, is set according to the SetApplyParameterTime command from the managing device in response to the SetApplyParameterTime command;
   and
   applying the unapplied parameter of the managed device at a specific time,
   wherein, the specific time is determined by the managed device within a certain period indicated by the applying opportunity of the unapplied parameter of the managed device.

2. The method of claim 1, wherein the applying opportunity is obtained from a flag of a data model of the managed device, the flag is modified by the managing device through a Remote Procedure Call (RPC) approach.

3. The method of claim 2, wherein the unapplied parameter of the managed device is one of:
   generated by the parameter modifying command;
   modified by the managing device; and
   generated by a specified session between the managing device and the managed device.

4. A managed device, wherein
   the managed device is configured to perform the following:
   receiving a parameter modifying command from a managing device;
   modifying a parameter according to the parameter modifying command;
   sending a first command response to the managing device, indicating an applying opportunity of an unapplied parameter of the managed device, which is generated by the parameter modifying command in response to the parameter modifying command;
   receiving a GetParameterValues command to inquire the applying opportunity of the unapplied parameter of the managed device, which is generated by the parameter modifying command from the managing device;
   sending a second command response to the managing device, indicating the applying opportunity of the unapplied parameter of the managed device, which is generated by the parameter modifying command, in response to the GetParameterValues command;
   receiving a SetApplyParameterTime command to modify the applying opportunity of the unapplied parameter of the managed device, which is generated by the parameter modifying command from the managing device;
   sending a third command response to the managing device indicating that the applying opportunity of the unapplied parameter of the managed device, which is generated by the parameter modifying command, is set according to the SetApplyParameterTime command from the managing device in response to the SetApplyParameterTime command;
   and
   applying the unapplied lied parameter of the managed device at a specific time, wherein, the specific time is determined by the managed device within a certain period indicated by the applying opportunity of the unapplied parameter of the managed device.

* * * * *

UNITED STATES PATENT AND TRADEMARK OFFICE
CERTIFICATE OF CORRECTION

PATENT NO. : 8,209,404 B2  
APPLICATION NO. : 13/177095  
DATED : June 26, 2012  
INVENTOR(S) : Huangwei Wu Page 1 of 1

It is certified that error appears in the above-identified patent and that said Letters Patent is hereby corrected as shown below:

Column 20, line 59, Claim 4, "unapplied lied parameter" should read -- unapplied parameter --.

Signed and Sealed this  
Sixteenth Day of October, 2012

David J. Kappos  
*Director of the United States Patent and Trademark Office*